Aug. 12, 1952 J. M. KUHLIK 2,606,766
SOUND RECORDING AND REPRODUCING MACHINE
Filed May 5, 1949 2 SHEETS—SHEET 1

INVENTOR.
Jacob M. Kuhlik
BY
Edw. S. Higgins
ATTORNEY

Aug. 12, 1952    J. M. KUHLIK    2,606,766
SOUND RECORDING AND REPRODUCING MACHINE
Filed May 5, 1949    2 SHEETS—SHEET 2
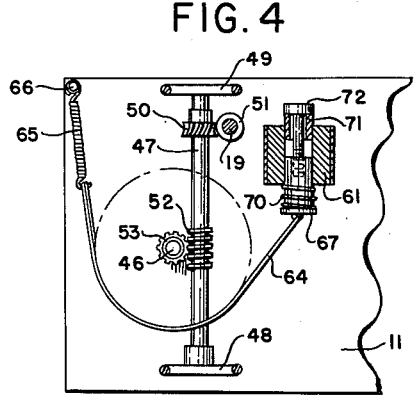
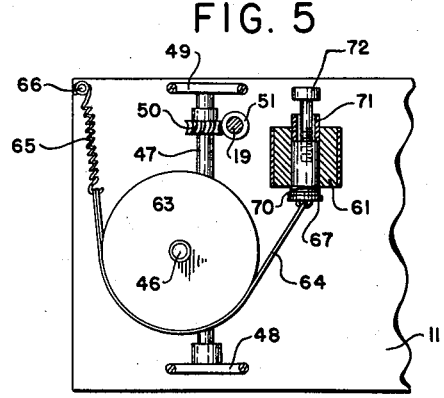
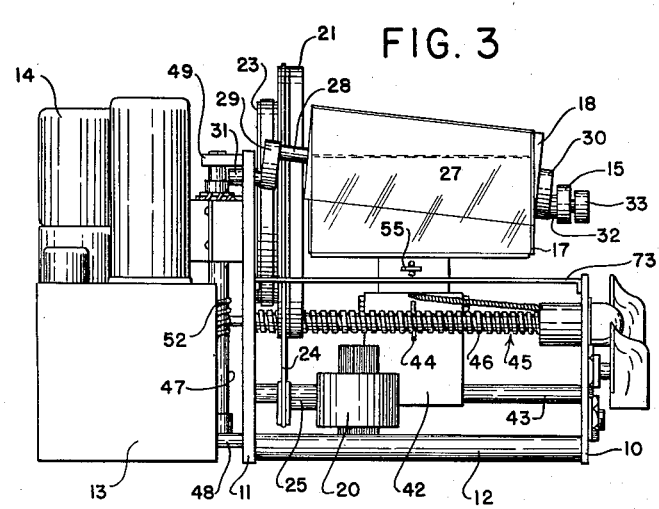
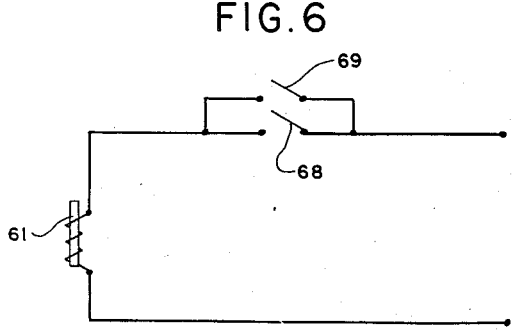
INVENTOR.
Jacob M. Kuhlik
BY
Edw. S. Higgins
ATTORNEY Patented Aug. 12, 1952

2,606,766

UNITED STATES PATENT OFFICE 2,606,766

SOUND RECORDING AND REPRODUCING MACHINE

Jacob Miles Kuhlik, Brooklyn, N. Y.

Application May 5, 1949, Serial No. 91,515

5 Claims. (Cl. 274—11)

This invention relates to sound recording and reproducing machines.

In machines of this type in which endless films, bands or records are used, the film or band is supported on, driven by and travels around a pair of spaced rollers, one of which is the drive roller and the other the driven roller. Although the film is flexible, it is very difficult to mount on and take off of the rollers and fit it over the rollers so that it will stay on the rollers in operative position and be driven thereby. Furthermore such endless films often tend to creep along the rollers and become displaced. Also in retracting the sound or stylus head over the drive screw, it is usually necessary to disengage the sound head and reset the head manually by hand which is inconvenient and often inaccurate.

It is a prime object of the present invention to overcome these difficulties.

Another object is to provide such a machine with film or band supporting rollers that are adjustable so that the overall distance therebetween may be varied in order to facilitate mounting and demounting of an endless film or band thereon and therefrom respectively.

Another object is to so mount the rollers that the endless film when supported thereon will have a tendency to move inwardly and stay in operative position with no external pressure guides.

Another object is to provide means for automatically retracting the sound head track by track.

Another object is to provide such apparatus with improved means for driving the film.

Another object is to provide a machine of this type that is simple in construction, inexpensive to manufacture and highly efficient in operation.

Other objects and advantages of the invention will be apparent from the description thereof to follow taken in connection with the accompanying drawings in which—

Fig. 3 is an end view thereof, looking from the left hand end of Fig. 2.

Fig. 4 is a fragmentary sectional detail view showing the mechanism for retracting the sound head track by track, with the parts in inoperative position.

Fig. 5 is a similar view showing the parts in operative position.

Fig. 6 is a diagrammatic view showing the circuit for the solenoid of the retracting mechanism.

Figure 1:
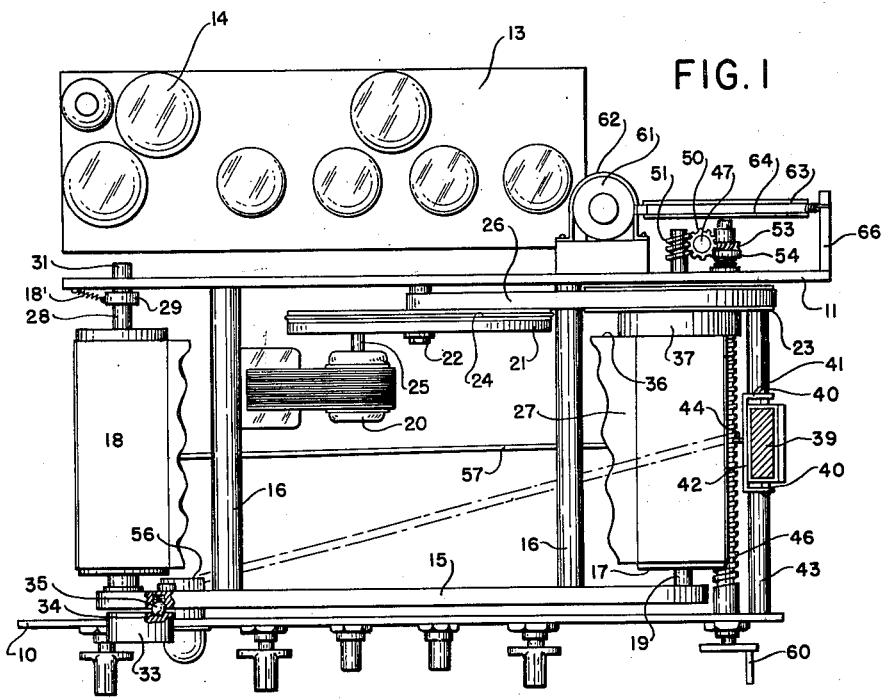
Fig. 1 is a top plan view of a sound recording and reproducing machine embodying my invention, parts being shown broken away and parts being omitted and parts being shown in section for clarity.

The improved apparatus is to be housed in a suitable cabinet or casing (not shown) and includes a frame for supporting the various mechanisms of the apparatus. The frame consists of a front wall 10 and a rear wall 11 rigidly connected together by rods 12 at their ends. The front wall 10 constitutes the instrument board of the machine and extends upwardly to a point just beyond the center of the rear wall 11. A chassis 13 is mounted to the rear of the rear wall 11 for supporting the various tubes 14 and for housing the wiring and other parts for said tubes.

A front bar 15 is supported at the top of the frame by rods 16, 16 extending forwardly from the rear wall 11. Supported between said bar and rear wall at one end of the frame is a drive roller 17 and at the other end a driven roller 18. Drive roller 17 has its shaft 19 journalled in the bar 15 and rear wall 11.

The mechanism for driving roller 17 comprises a motor 20 suitably fastened to the frame, a disc wheel 21 rotatably supported on a stub shaft 22 extending forwardly from the front surface of the rear wall 11 and a pulley 23 fixed on shaft 19 of roller 17. A coiled wire belt 24 brings the drive from the shaft 25 of the motor to disc wheel 21 and a flexible belt 26 brings the drive from wheel 21 to the pulley 23 whereby the roller 17 is rotated.

Figure 2:
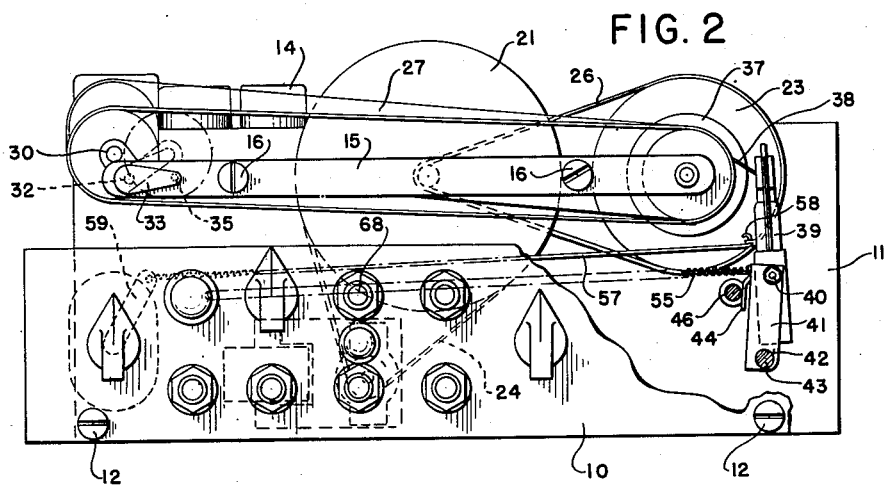
Fig. 2 is a side view of the machine of Fig. 1, parts being broken away.

An endless film, band or record 27 is supported by the rollers 17 and 18 and is made of film-like material such as acetate or the like which is capable of having grooves or tracks formed thereon by an embossing stylus or cutting stylus. The film is to be driven by its frictional engagement with said rollers and therefore must be supported in a taut condition. Mounting and demounting such endless film on the rollers and holding it in such taut condition present a difficult problem. Such endless films also have a tendency to creep off of the rollers and become displaced. I have solved these problems by mounting the driven roller 18 so that it can be swung or pulled bodily toward and away from the drive roller 17 by a spring 18' in order to shorten the overall distance between said rollers for mounting the endless film and in order to lengthen the distance when the film is mounted thereon to bring it to a taut condition. The roller 18 is also mounted at an angle to the horizontal so that the film will tend to creep toward the inner ends of the rollers and thereby stay in operative position. This is accomplished by supporting the roller shaft 28, which is axially or centrally of the roller 18, on the inner ends of arms 29 and 30. The outer end of arm 29 is fixed on a stub shaft 31 journalled in rear wall 11, and the outer end of arm 30 is fixed on a stub shaft 32 journalled in the end of bar 15. An actuating knob 33 is fastened to the outer end of shaft 32 for swinging the roller 18 and recess 34 in the free end of said knob coacts with a spring-pressed ball 35 for yieldingly holding the roller 18 in downwardly swung position, the ball being mounted in the bar 15. Roller 18 is shown in dotted lines in downwardly and inwardly swung position in Fig. 2. The spring 18' has one end fastened to the rear wall 11 and its other end to the arm 29 of roller 18 whereby said spring automatically urges the roller 18 upwardly and rearwardly permitting it to yield in order to keep the endless film under tension always regardless of size of the film.

The centers of shafts 31 and 32 form the axis about which the roller 18 swings and while these centers are in alinement with each other, the shaft 31 is mounted at a slight angle to the horizontal and is slightly higher than the shaft 32 whereby the roller 18 is mounted at an angle to the horizontal. This provides a sort of twist longitudinally of the endless film whereby the film tends to creep inwardly so that its inner edge 36 will tend to engage the inner surface of the hub portion 37 of pulley 23 and be guided thereby in its movement and thus held in proper operative position on the rollers.

The apparatus herein described is of the type which embraces a laterally undulating groove of constant depth on the record 27. A stylus 38 is mounted in a stylus head or sound box 39 which may be of any standard design suitable for receiving an electric current with alternations of an amplitude and frequency varying in accordance with the amplitude and frequency of sound waves and causing a mechanical lateral vibration of the stylus of an amplitude and frequency corresponding to the amplitude and frequency of the current alternations, and vice versa, receiving the laterally undulating vibrations of the stylus and electromagnetically generating an electric current in conductors leading from the stylus head having alternations of amplitude and frequency corresponding to those of the stylus. The stylus head is connected to an ordinary frequency amplifier mounted in the chassis 13.

The apparatus employs the stylus 38 and the stylus head 39 both for recording and for reproducing sound. The stylus head 39 is pivotally mounted on the pointed ends of trunnion screws 40 extending inwardly from the flanged portions 41 of a substantially U-shaped bracket 42. Bracket 42 is slidably and pivotally mounted on a shaft 43 extending between and supported by the front wall 10 and rear wall 11 of the frame. Sliding movement along shaft 43 is imparted to the bracket by means of a pin 44 secured to the outer surface of the bracket near its upper edge, which pin extends slightly outwardly from said surface and is adapted to engage and coact with the grooves 45 in a screw shaft 46 extending parallel with said shaft 43 and supported by the front and rear walls of the frame. Rotary movement of the screw shaft 46 imparts a sliding movement to the bracket 42 by means of the pin and groove connection.

Screw shaft 46 is operatively connected to the shaft 19 of drive roller 17 whereby said screw shaft is driven. This connection includes a vertically disposed shaft 47 rotatably mounted in lower and upper brackets 48 and 49, respectively, on the rear surface of the rear wall 11 at one end thereof. A worm gear 50 is fixed on shaft 47 near its upper end, which gear is in mesh with a worm 51 fixed on the rearwardly extending end of shaft 19 of drive roller 17. Midway its ends, shaft 47 is provided with a worm 52 which meshes with a slip worm gear 53 which is loosely mounted on the screw shaft 46. A flexible fabric washer 54 is mounted between the worm gear 53 and the rear wall 11 of the frame and is in spring-pressed engagement with the worm gear 53 so that said worm gear is held on the screw shaft 46 with sufficient friction to prevent relative rotation of said worm gear on the screw shaft whereby turning of said worm gear 53 will turn the screw shaft 46 for imparting a step by step motion to the stylus head 39 along said screw shaft.

The bracket 42 which carries the stylus head 39 is held in operative position and the pin 44 is held in contact with the grooves on the screw shaft 46 by means of an elongated spring member 55, one end of which is anchored to a stationary part of the frame as indicated at 56 and its other end is fastened to the bracket 42. This spring member presses the pin 44 into operative engagement with the grooves on the screw shaft 46.

Inasmuch as the stylus 38 and the stylus head 39 are both used for recording and reproducing sound, the pressure of the stylus on the film must be adjusted. For this purpose I provide an elongated spring member 57 having one end fastened to the stylus head as indicated at 58 and having its other end fastened to a rotatably adjusting member 59 mounted on the frame. By moving the member 59, the spring member 57 may be made to provide the necessary firm pressure of the stylus on the film for recording purposes and also the necessary light pressure for reproducing purposes as will be understood.

It is often found necessary to retract the stylus head or bring it back to a preformed track for certain purposes. This may be accomplished manually by turning a crank member 60 fastened to the outer end of the screw shaft 46 in the proper direction, whereby the pin and groove connection between the screw shaft and bracket 42 will move the stylus head backward along the screw shaft carrying the stylus 38 across the film 27.

The present invention has made provision for accomplishing this retracting of the stylus head automatically. In the circuit for the motor 20 is a solenoid 61 which is mounted on the rear surface of the rear wall 11 by means of a strap 62 or may be secured thereto in any other suitable manner. Fixed on the rearwardly protruding end of the screw shaft 46 is a pulley 63 having a grooved periphery and in normally loose or slack engagement with the periphery of said pulley is a flexible belt 64. One end of the belt is fastened to a coiled spring 65 fastened to a rearwardly extending stud 66 on the rear wall 11 and the other end of the belt is fastened to the end of the plunger 67 of the solenoid 61. When the solenoid is not energized, the pulley turns with the screw shaft 46. When the solenoid is momentarily energized, the plunger 67 is drawn upward carrying the belt upwardly and into tight frictional engagement with the pulley 63 whereby a torsional pull is exerted on the pulley thereby turning the screw shaft 46 one step or track in a backward direction which carries with it the stylus head 39 and stylus 38 across the film. The loose mounting of the worm gear 53 on the screw shaft 46 permits this turning of the worm shaft 53 relative to said worm gear.

The solenoid is brought into circuit by a switch button 68 mounted on the front wall 10. The solenoid may however be brought into circuit by a switch positioned remotely from the apparatus such as on the floor, which remote switch is indicated diagrammatically at 69 in Fig. 6.

The belt 64 is so prearranged that when the solenoid is deenergized, the compression spring 70 encircling the plunger 67 will snap the plunger back to down position without effecting rotation of the pulley 63. Upward movement of the plunger is limited by its inner end striking the inner end of a sleeve member 71 and its downward movement is limited by its head or knob 72 engaging the outer end of said sleeve.

A plastic floor 73 may be mounted below the rollers 17 and 18 by securing it to the front wall 10 and rear wall 11 of the frame. Such a floor permits a tool such as a screw driver to be used in mounting the endless film on the rollers as the floor provides a support for the end of such tool when the tool is swung inwardly against the outer or following edge of said endless film to provide pressure against said outer edge. The floor may be made of metal or other suitable material.

The front wall 10 supports the usual knobs and pilot lights for their desired purposes but form no part of this invention.

Changes in details might be made without departing from the principle of the invention.

I claim:

1. In a sound recording and reproducing machine, a frame including a rear wall, a bar supported by said wall forwardly thereof, a drive roller journalled in said wall and bar at one end of the frame, a stub shaft journalled in said rear wall at the opposite end of the frame, a stub shaft journalled in said bar opposite the first-named stub shaft, an arm fixed on each of said stub shafts at one end, a rotatable roller journalled in the other end of said arms and swingable with said arms toward and away from the drive roller for changing the overall distance around said rollers, an actuating knob on the outer end of the stub shaft supported by said bar, said knob having a recess adjacent its end and a spring-pressed ball member mounted in the bar for coacting with said recess for holding the knob and second-named roller in swung position.

2. In a sound recording and reproducing machine, a frame, a motor supported by said frame, a roller swingably mounted at one end of the frame, a roller rotatably mounted at the other end of the frame and operatively connected to said motor and driven thereby, said connection including a disc wheel supported by the frame, a flexible connection between the motor shaft and said disc wheel, a pulley on the shaft of said second-named roller and a flexible belt connecting said disc wheel and said pulley.

3. In a sound recording and reproducing machine, a motor, a pair of spaced rollers, one of said rollers being operatively connected to said motor and driven thereby, a film supported by said rollers and driven thereby, a screw shaft disposed transversely of the film, another shaft disposed parallel to said screw shaft, a sound head slidable along said second-named shaft, means of connection between the sound head and said screw shaft for moving the sound head along the screw shaft in one direction and means for retracting said sound head along the screw shaft in the opposite direction including a solenoid in circuit with said motor, a pulley on said screw shaft and a belt operatively connected to the pulley and adapted to be actuated by said solenoid for turning the pulley and screw shaft.

4. In a sound recording and reproducing machine, a frame, a motor, a pair of spaced rollers, one of said rollers being operatively connected to said motor and driven thereby, an endless film supported on said rollers and driven thereby, a screw shaft disposed transversely of the endless film, another shaft disposed parallel to said screw shaft, a sound head slidable along the second-named shaft, means of connection between the sound head and the screw shaft for moving said sound head along the screw shaft in one direction and means for retracting said sound head along the screw shaft in the opposite direction including a solenoid in circuit with the motor, a pulley on said screw shaft, a belt having one end yieldingly connected to the frame and its other end connected to the plunger of the solenoid, the portion of the belt intermediate its ends being in engagement with the periphery of the pulley whereby inward movement of the plunger imparts a torsional movement to the belt and pulley for rotating the screw shaft.

5. In a sound recording and reproducing machine, a motor, a pair of spaced rollers, one of said rollers being operatively connected to said motor and driven thereby, an endless film supported on said rollers, a screw shaft disposed transversely of the endless film, another shaft disposed parallel to said screw shaft, a sound head slidable along said second-named shaft, a stylus carried by said sound head and adapted to contact said endless film, means of connection between the sound head and screw shaft for moving said sound head along the screw shaft and across the film including a bracket pivotally mounted on said second-named shaft and a pin on said bracket engaging said screw shaft and means including an elongated spring member for adjusting the pressure of the stylus on the film and for yieldingly holding the pin in engagement with the screw shaft.

JACOB MILES KUHLIK.

REFERENCES CITED

The following references are of record in the file of this patent:

UNITED STATES PATENTS

| Number | Name | Date |
|---|---|---|
| 2,028,224 | Langley | Jan. 21, 1936 |
| 2,199,893 | Norton et al. | May 7, 1940 |
| 2,233,915 | Conrad | Mar. 4, 1941 |
| 2,257,796 | Heineke | Oct. 7, 1941 |
| 2,284,043 | Clausen | May 26, 1942 |
| 2,318,828 | Yerkovich | May 11, 1943 |
| 2,338,414 | De Sart | Jan. 4, 1944 |
| 2,535,480 | Begun | Dec. 26, 1950 |

FOREIGN PATENTS

| Number | Country | Date |
|---|---|---|
| 6,220 of 1906 | Great Britain | Oct. 25, 1906 |
| 355,871 | Italy | Jan. 19, 1938 |